(12) United States Patent
Eisenberger et al.

(10) Patent No.: US 7,164,214 B2
(45) Date of Patent: Jan. 16, 2007

(54) UNINTERRUPTIBLE DC POWER SUPPLY FOR EQUIPMENT ASSOCIATED WITH A MOBILE SITE

(75) Inventors: Dean Eisenberger, 430 Penn Rd., Plymouth Meeting, PA (US) 19462; Jeff Legg, Mullica Hill, NJ (US)

(73) Assignee: Dean Eisenberger, Plymouth Meeting, PA (US)

( * ) Notice: Subject to any disclaimer, the term of this patent is extended or adjusted under 35 U.S.C. 154(b) by 465 days.

(21) Appl. No.: 10/304,206

(22) Filed: Nov. 25, 2002

(65) Prior Publication Data

US 2004/0124709 A1 Jul. 1, 2004

(51) Int. Cl.
*H02J 1/10* (2006.01)

(52) U.S. Cl. .............................. 307/29; 307/18; 307/23; 307/38; 307/39

(58) Field of Classification Search ................. 307/66, 307/18, 23, 29, 38, 39, 19
See application file for complete search history.

(56) References Cited

U.S. PATENT DOCUMENTS

| | | | |
|---|---|---|---|
| 4,950,913 A | 8/1990 | Kephart | 307/10.7 |
| 5,159,257 A | 10/1992 | Oka et al. | 320/136 |
| 5,272,386 A | 12/1993 | Kephart | 307/116 |
| 5,327,068 A | 7/1994 | Lendrum et al. | 320/136 |
| 5,332,958 A | 7/1994 | Sloan | 320/136 |
| 5,343,137 A | 8/1994 | Kitaoka et al. | 320/132 |
| 5,381,295 A | 1/1995 | Rund et al. | 361/92 |
| 5,461,262 A * | 10/1995 | Hirasawa et al. | 307/10.1 |
| 5,488,283 A * | 1/1996 | Dougherty et al. | 307/10.1 |
| 5,563,452 A | 10/1996 | Kephart | 307/10.1 |
| 5,917,250 A * | 6/1999 | Kakalec et al. | 307/18 |
| 6,239,578 B1 * | 5/2001 | Schnell et al. | 320/119 |
| 6,737,762 B1 * | 5/2004 | Koenig | 307/48 |
| 2001/0022471 A1* | 9/2001 | Cook et al. | 307/10.1 |
| 2003/0045977 A1* | 3/2003 | Sato et al. | 701/35 |
| 2003/0233589 A1* | 12/2003 | Alvarez | 713/300 |

FOREIGN PATENT DOCUMENTS

JP 2001337125 A * 12/2001

* cited by examiner

*Primary Examiner*—Brian Sircus
*Assistant Examiner*—Daniel Cavallari
(74) *Attorney, Agent, or Firm*—Gary M. Cohen

(57) ABSTRACT

A programmable uninterruptible power supply for coupling battery powered systems associated with a mobile site, such as a vehicle, to the primary electrical system of the mobile site operates to selectively couple the battery powered systems to the electrical system of the mobile site and to a secondary, or back-up battery separate from the primary battery associated with the electrical system of the mobile site. Various system control functions are performed, including reverse battery protection, over voltage and under voltage protection, battery drain protection, battery charging detection, reverse current detection and uninterruptible power switching. For detected adverse operating conditions, the load is disconnected from the electrical system of the mobile site and the back-up battery is used to operate the battery powered systems which are to be protected from such adverse operating conditions.

114 Claims, 12 Drawing Sheets

UNINTERRUPTIBLE DC POWER SUPPLY FOR EQUIPMENT ASSOCIATED WITH A MOBILE SITE

BACKGROUND OF THE INVENTION

The present invention generally relates to systems for delivering electrical power to equipment, such as computers and communications equipment, associated with a mobile site such as a vehicle.

Any of a variety of applications have arisen that are enhanced by placing support equipment, such as computers and communications equipment, in a vehicle to provide the operator of the vehicle with increased connectivity to remotely available information and/or personnel. For example, it has been found to be beneficial to provide police, fire and emergency vehicles with such equipment to rapidly establish routing, to remotely access desired data and to communicate with command or other support personnel. Similarly, it has been found to be beneficial to provide service and/or route vehicles with such equipment to establish routing, to provide desired services and to access remote data useful in performing such services, among others.

Irrespective of the application being implemented, it is conventional practice to couple such equipment with the electrical system of the vehicle that receives such equipment. The electrical system of the vehicle (i.e., the alternator or generator, the voltage regulator, the storage battery, etc.) can then be used to conveniently supply the direct current (DC power) which is needed to operate the equipment associated with the vehicle.

In practice, however, it has been found that while such systems work well to supply the power necessary for operating such equipment while the vehicle is in operation, difficulties can arise when operation of the vehicle is discontinued (i.e., the engine is shut off) but continued operation of the associated equipment is desired.

For example, electrical equipment which remains in operation after the vehicle has been shut off will continue to draw power from the electrical system of the vehicle. Because the vehicle is no longer running, the vehicle's electrical system will no longer be charging. Over an extended period of time, this can reduce the voltage produced by the storage battery associated with the vehicle's electrical system to a level which is no longer sufficient to re-start the vehicle. Because this is generally considered to be an undesirable result, at times presenting an unacceptable risk, efforts have been made to develop systems for limiting the amount of time that the support equipment remains coupled with the vehicle's electrical system. The overall goal of such systems is to prevent the support equipment from reducing the battery voltage to a level that would be insufficient to start the vehicle (e.g., on the order of 11 volts). As a result, the battery is maintained in a condition that will allow the vehicle to be started when this becomes desirable.

Early efforts to accomplish this employed a relatively simple timer function, for disconnecting the equipment from the vehicle's battery after an established period of time. This period of time was selected to be sufficiently short to prevent the battery voltage from dropping below a safe level. After the established period had passed, the equipment was disconnected from the vehicle's battery to prevent the battery from further discharge.

Enhancements were then added to such basic systems to improve their versatility, and to increase the amount of time that the equipment could safely remain connected to the vehicle's battery. For example, voltage level-detecting equipment was added, initially to determine when the battery voltage was approaching an undesirable level, and later to determine when the battery voltage was leaving a range which would be safe for further operations to continue (i.e., over voltage and under voltage detection). Steps were also taken to detect when the vehicle was running, to in such cases allow the equipment to remain connected to the battery (which would at that point be charging responsive to the running vehicle's electrical system) irrespective of the passage of the period of time established for disconnecting the equipment from the vehicle's battery. Other enhancements were similarly developed to improve the versatility of such systems.

Nevertheless, such systems have, to date, exhibited various problems and disadvantages when placed into operation. For example, such systems have tended to provide poor timing accuracy. This can either prematurely disconnect the equipment from the supporting battery, or cause the battery to remain connected to the equipment for too long a period, drawing the battery's voltage down below an acceptable level.

Yet another disadvantage is that previous systems were implemented using analog design methods. As a result, the circuits of such systems were subject to component drift, with temperature and time, and to component tolerances.

Yet another disadvantage is that such systems tended to be unreliable in detecting that the vehicle was running, again leading to system compromises. Previous implementations used analog techniques with very simple state machines. To detect that a vehicle is running, fast signal capture and the detection of running signals over an extended period of time (e.g., 1 to 4 seconds) is required to reduce the system's susceptibility to noise. Analog techniques have a difficult time accommodating this requirement. For example, a previously employed technique for detecting a running vehicle uses a fast pulse average energy detection method. The problem with this technique is that the pulse energy during normal engine operation changes widely over time (with engine RPM), making a suitable detector difficult to implement. Such circuits can also fail to distinguish between a single large energy pulse and plural smaller energy pulses having the same total energy.

Yet another disadvantage of such systems is that when a vehicle is started, the voltage condition of the vehicle's battery can be adversely affected by the significant amounts of current that are drawn by the vehicle's starter motor. Depending upon the general condition of the battery, operation of the starter motor can pull the voltage on the battery down to a level which is too low for proper operation of the equipment which is being supported by the battery. This can, in turn, cause such equipment to shut down to the extent that it becomes necessary to re-start (i.e., re-boot) such equipment. This commonly results in an undesirable loss of volatile memory. For example, data and/or temporary files can be lost, and data transfers then in progress can be discontinued.

Moreover, irrespective of their manner of operation, such systems will at some point operate to disconnect the equipment which is being supplied with power from the vehicle's battery. For systems using a simple timer, this will occur after the set period of time passes. For systems with more enhanced functions, this may be delayed to some extent through the detection of voltages, or by monitoring other system parameters. Ultimately, however, the equipment will at some point be disconnected from the battery which is to supply that equipment with the power needed for its continued operation. It would be beneficial to extend the period of time available before such equipment had to be disconnected from its power source.

SUMMARY OF THE INVENTION

In accordance with the present invention, these and other disadvantages are overcome by providing a programmable uninterruptible power supply for coupling battery powered systems (or a single system) associated with a mobile site, such as a vehicle, to the primary electrical system of the mobile site. The programmable uninterruptible power supply of the present invention operates to selectively couple the battery powered systems to the electrical system of the mobile site and to a secondary, or back-up battery separate from the primary battery associated with the electrical system of the mobile site.

The programmable uninterruptible power supply operates to implement logic and filtering algorithms capable of performing various system control functions for providing reverse battery protection, over voltage and under voltage protection, battery drain protection, battery charging detection, reverse current detection and uninterruptible power switching. When the detected operating conditions are determined to be adverse to continued connection of the battery powered systems to the electrical system of the mobile site, the load is disconnected from the electrical system of the mobile site (to protect the primary battery) and a back-up battery is used to operate the battery powered systems which are to be protected from such adverse operating conditions (to protect the volatile memory associated with the battery powered systems). A manual override is provided to allow the operator of the system to override the automatic functions of the system, if desired.

In operation, for example, in conjunction with a mobile site such as a vehicle, when the vehicle is operated and charging of the battery associated with the vehicle is detected, the power supply of the present invention operates to connect the vehicle's battery to the battery powered systems which are to be operated. When the battery is no longer charging (e.g., when the vehicle is turned off), a timer is started and the power supply keeps the battery connected to the battery powered systems, allowing such equipment to remain operational for a specified period of time.

At the end of this period, the battery powered systems are disconnected from the vehicle's battery. Any battery powered systems that are to be protected (e.g., those containing volatile memory) will remain connected to the back-up battery, maintaining an adequate supply of power to such protected systems and in this way preventing a disturbance in operation which could lead to a loss of volatile memory or other undesirable results.

Further in accordance with the present invention, the back-up battery can be used to operate the battery powered systems to be protected when other adverse operating conditions are detected. For example, this can take place if the voltage on the vehicle's battery drops below a specified threshold (e.g., while starting the vehicle with a battery in a low or drained condition). The uninterruptible power supply of the present invention operates to not only protect the vehicle's battery, but to continue to provide the battery powered systems which are to be protected with power for their continued operation during adverse voltage conditions, protecting such systems from the potential effects of such adverse voltage conditions.

DETAILED DESCRIPTION OF THE INVENTION

Figure 1:
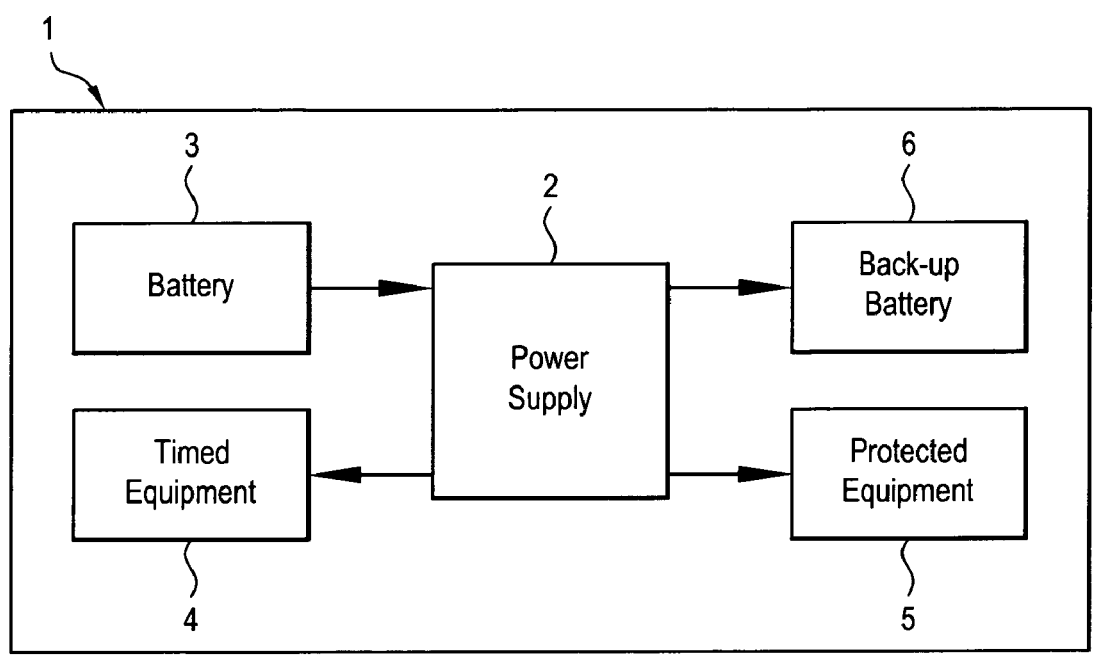
FIG. 1 is a block diagram showing an overview of the system of the present invention.

FIG. 1 provides an overview of an electrical system 1 which is produced in accordance with the present invention. The system 1 generally comprises a programmable uninterruptible power supply 2 which operatively and selectively connects a main, or primary battery 3 associated with the electrical system of the mobile site which incorporates the system 1 to desired battery powered systems. This can include battery powered systems which are not subject to the effects of adverse voltage conditions, and which can be disconnected from their power source without adverse results, for example, responsive to a timer (hereafter referred to as timed equipment 4), and to battery powered systems which are subject to the effects of adverse voltage conditions and which are to be protected from the effects of such adverse voltage conditions (hereafter referred to as protected equipment 5). A secondary, or back-up battery 6 which is separate from the primary battery 3 associated with the electrical system of the mobile site is further electrically coupled with the power supply 2.

It is to be understood that the system 1 shown in FIG. 1, and the several components which comprise the system 1 shown in FIG. 1, are illustrative, and that any of a variety of alterative components can be used to implement the improvements of the present invention. For example, the mobile site can be a vehicle, such as a car, truck or service vehicle, or some other type of mobile platform, such as a trailer. The equipment 4 can be any equipment which is capable of being operated by the direct current (DC) which is being supplied by the battery 3, examples including communications equipment for providing an operator with increased connectivity to remotely available information and/or personnel. The equipment 5 can be any equipment which is capable of being operated by the direct current (DC) which is being supplied by the battery 3 and having components that are subject to a loss of data, examples including on-board computers and other data transferring equipment, ground positioning (GPS) equipment, and programmable components associated with the communications equipment.

The battery 3 will in most cases be a conventional storage battery (e.g., a 12 volt storage battery) of the type commonly used in vehicle-based applications. It is also possible, however, for the battery 3 to be supplemented by a generator (e.g., an alternator) in cases where the mobile site is a vehicle, or to be supplemented or even replaced by a generator (e.g., a mobile, gas powered generator) in cases where the mobile site is a mobile platform or a trailer, for example. The battery 6 is preferably a deep cycle storage battery (e.g., on the order of 6 volts) capable of handling repeated charge/discharge cycles. For most applications, such deep cycle storage batteries will be capable of providing useful power for operating equipment having volatile memory for periods of time on the order of 15 minutes or so.

The description which follows addresses a preferred use for the power supply 2 of the present invention, that being to support battery powered equipment mounted in a vehicle. It is to be understood, however, that the description which follows is illustrative only, and that any of a variety of applications are possible for satisfying the operating requirements of different types of support equipment and to interface with a particular mobile site.

As an overview, the power supply 2 operates to selectively couple both the timed equipment 4 and the protected equipment 5 (one or more systems, as desired) to the electrical system of the vehicle (i.e., the battery 3). The power supply 2 operates to implement logic and filtering algorithms, which will be described more fully below, which are capable of performing various system control functions. This can include functions such as the reverse battery protection, over voltage and under voltage protection, battery drain protection, battery charging detection, reverse current detection and uninterruptible power switching which are illustrated in FIG. 2, or other functions that may prove to be desirable for a given application.

Figure 2:
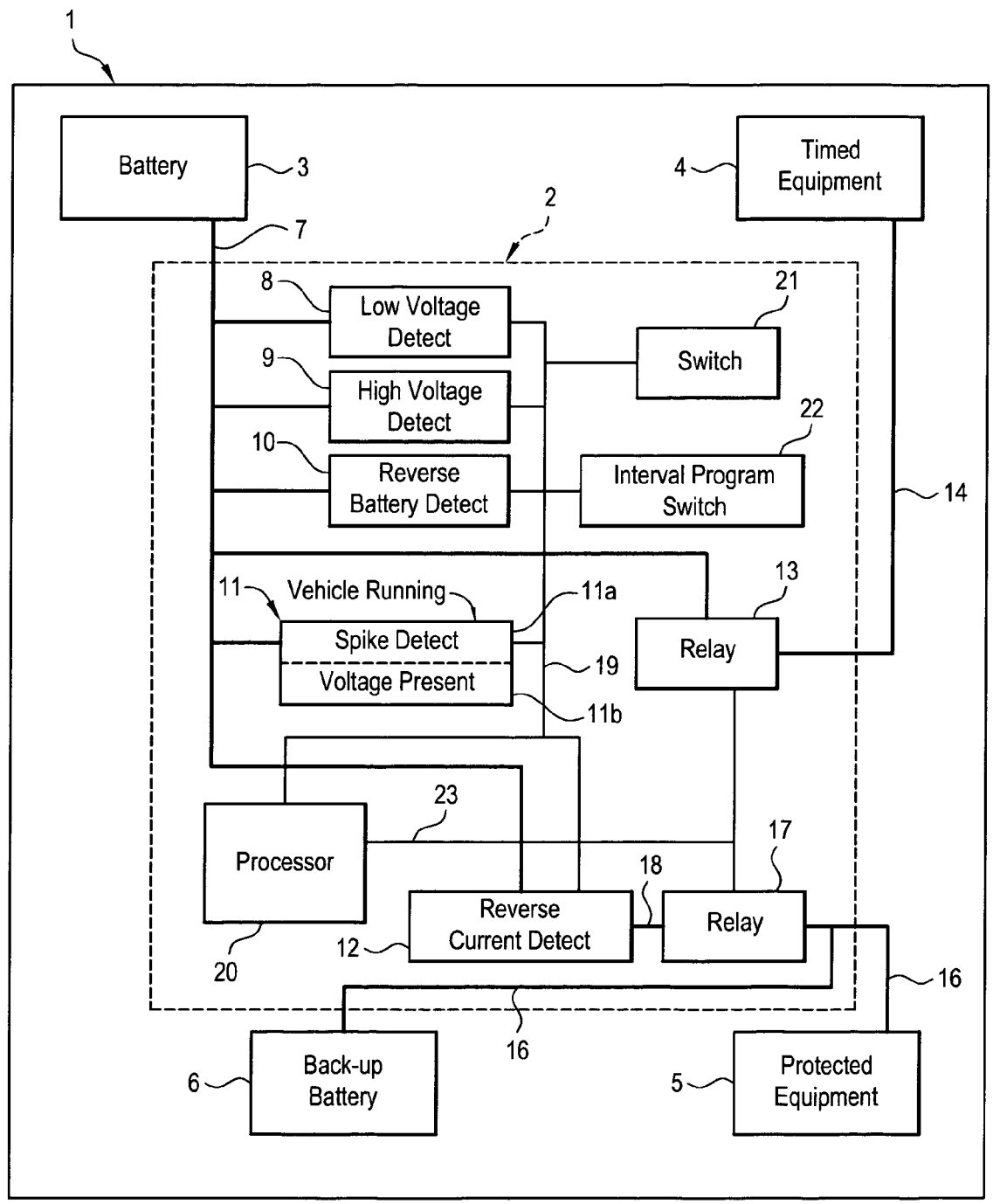
FIG. 2 is a block diagram showing the circuit components of the system shown in FIG. 1.

FIG. 2 is a block diagram illustrating the preferred components of the system 1 shown in FIG. 1. The battery 3 communicates with the power supply 2 via main power buss 7. The power buss 7 communicates, in parallel, with circuits for performing various control functions including a low voltage detection circuit 8, a high voltage detection circuit 9, a reverse battery detection circuit 10, a vehicle running circuit 11 having two components including a circuit 11a for detecting voltage spikes and a circuit 11b for detecting the presence of an operating voltage, and a reverse current detection circuit 12. The power buss 7 also communicates with a primary relay 13, the output of which (buss 14) is electrically coupled with the non-volatile, timed equipment 4. The relay 13 is selected to have a capacity sufficient to handle the current necessary for supporting the non-volatile equipment which is to be operated. A 30 amp relay should be sufficient for most applications.

The battery 6 communicates with the power supply 2 via back-up power buss 16. The back-up power buss 16 is electrically coupled with the volatile, protected equipment 5, and the output of a secondary relay 17. For purposes which will be discussed more fully below, the secondary relay 17 is selected to have a capacity sufficient to handle the current which is necessary for supporting the protected equipment 5 which is to be operated. A 6 amp relay should be sufficient for most applications. A buss 18 further connects the output of the reverse current detection circuit 12 to the input of the secondary relay 17.

A control buss 19 electrically connects outputs of the low voltage detection circuit 8, the high voltage detection circuit 9, the reverse battery detection circuit 10, the vehicle running circuit 11 and the reverse current detection circuit 12 to a processor 20. An override switch 21 additionally communicates with the control buss 19, and can be used to reset functions of the processor 20, as will be discussed more fully below. The override switch 21 is preferably implemented using a momentary contact switch. An interval program switch 22 additionally communicates with the control buss 19, and can be used to vary the timing for operation of the relays 13, 17, as will be discussed more fully below. The interval program switch 22 is preferably implemented using a DIP switch coupled with a series of resistors (having the same resistance values). The DIP switch operates as a digital input to the processor 20. Open switches are read as a logic "high" and closed switches are read as a logic "low" by the processor 20. Different switch settings will then operate to represent, and establish different timing intervals.

Responsive to the inputs received from the components in communication with the control buss 19, the processor 20 will produce an output at 23. Output buss 23 is electrically coupled with the primary relay 13 and the secondary relay 17, completing the power supply circuit 2.

In operation, let it be assumed that the vehicle is running and the vehicle's electrical system is in good working order. In such case, the detectors 8, 9, 10, 11, 12 will remain nominal, and the processor 20 will provide an output (buss 23) which closes the relays 13, 17. This will operate to connect the main battery 3 to the timed equipment 4 and to the protected equipment 5. In this mode, the reverse current detection circuit 12 will permit current to pass through to the buss 16, supplying current for operating the protected equipment 5 and for charging the back-up battery 6.

Let it now be assumed that the vehicle is turned off. In such case, the vehicle running circuit 11 will detect that the vehicle is no longer running and will signal the processor 20 of the change in state. Assuming that all other operating parameters remain nominal, the processor 20 will leave the relays 13, 17 closed, maintaining the connection of the main battery 3 to the timed equipment 4 and to the protected equipment 5, and will commence a count responsive to the timing set using the interval program switch 22.

If, at any time during the count, the vehicle is re-started, such an occurrence will be detected by the vehicle running circuit 11. The count then being performed by the processor 20 will be discontinued and, conditions permitting, the relays 13, 17 will remain closed, leaving the main battery 3 connected to the timed equipment 4 and to the protected equipment 5, and essentially returning the system 1 to its initial state.

When a vehicle is started, the voltage condition of the battery 3 can be adversely affected by the significant amounts of current that are drawn by the starter motor of the vehicle. Depending upon the condition of the battery (e.g., the amount of time that the battery has been powering the equipment 4, 5, the age and overall service condition of the battery, ambient conditions, such as temperature, etc.), it is possible for operation of the starter motor to pull the voltage on the battery 3 down to a level which is unacceptably low for proper operation of the equipment 4, 5, particularly the protected equipment 5. For example, under such conditions, the voltage applied to the protected equipment 5 could be drawn down to a level capable of causing such equipment to shut down, at least to the extent that volatile memory associated with such equipment would be compromised.

To avoid such occurrences, the reverse current detection circuit 12 operates to detect when the voltage on the buss 7, and accordingly, the battery 3, has dropped below the voltage present on the buss 16, which will result in a reversal of the current. The processor 20 can then operate to temporarily deactivate the relay 17 during such adverse conditions, allowing the back-up battery 6 to continue to operate the protected equipment 5 during such periods. This will, in turn, operate to avoid the adverse conditions that could result from a shut down of such equipment, and a compromise of the volatile memory associated with such equipment.

When the desired count is reached, signifying that the timer function of the power supply 2 has timed out, or in the event that a fault in the vehicle's electrical system is detected before the desired count has been reached (e.g., the voltage on the battery 3 drops to an unsafe level faster than the scheduled count had anticipated), the processor 20 will then operate to deactivate the relays 13, 17, disconnecting the main battery 3 from the timed equipment 4 and from the protected equipment 5. The timed equipment 4 will be shut down as a result of this, which is acceptable because there will be no loss of function upon the reactivation of such equipment. The protected equipment 5 will remain connected to and will continue to receive power for its operation from the back-up battery 6, maintaining the supply of power to any volatile memory and avoiding potential losses of function.

In addition to the foregoing, the power supply 2 can operate to protect both the timed equipment 4 and the protected equipment 5 from other faults developing in the electrical system of the vehicle, if desired. For example, a defective battery, a defect in one of the components of the vehicle's electrical system (e.g., the alternator or generator, or the voltage regulator) or a short in the electrical system, can be detected by one of the detection circuits 8, 9. If the battery 3 has been disconnected or removed (e.g., to service the vehicle or to replace the battery 3), the detection circuits 10, 12 can operate to detect whether the battery terminal connections have been established with the correct polarity upon reconnection of the battery.

Upon the detection of adverse conditions which could be deleterious to the timed equipment 4 and/or to the protected equipment 5, the processor 20 can operate to deactivate either, or preferably both of the relays 13, 17 to isolate and protect the timed equipment 4 and the protected equipment 5 The back-up battery 6 will remain connected to the protected equipment 5 to avoid the undesirable loss of volatile data during such occurrences. In most cases, it is presently considered to be desirable to simultaneously deactivate both of the relays 13, 17, to isolate and protect both the timed equipment 4 and the protected equipment 5. However, it would also be possible to selectively deactivate the relays 13, 17, to separately protect either the timed equipment 4 or the protected equipment 5, should this become desirable.

If, at any time after the count has been completed, the vehicle is re-started (detected by the vehicle running circuit 11), or if any adverse electrical conditions are corrected (detected by the low voltage detection circuit 8, the high voltage detection circuit 9, the reverse battery detection circuit 10 and the reverse current detection circuit 12), the processor 20 can then operate to reactivate the relays 13, 17, reconnecting the main battery 3 to the timed equipment 4 and to the protected equipment 5, once again returning the system 1 to its initial state. Current delivered from the battery 3, through the relay 17, can then be used to recharge the back-up battery 6, which may have become discharged during back-up of the protected equipment 5. Such operations will again be subject to control responsive to the reverse current detection circuit 12.

Figure 3:
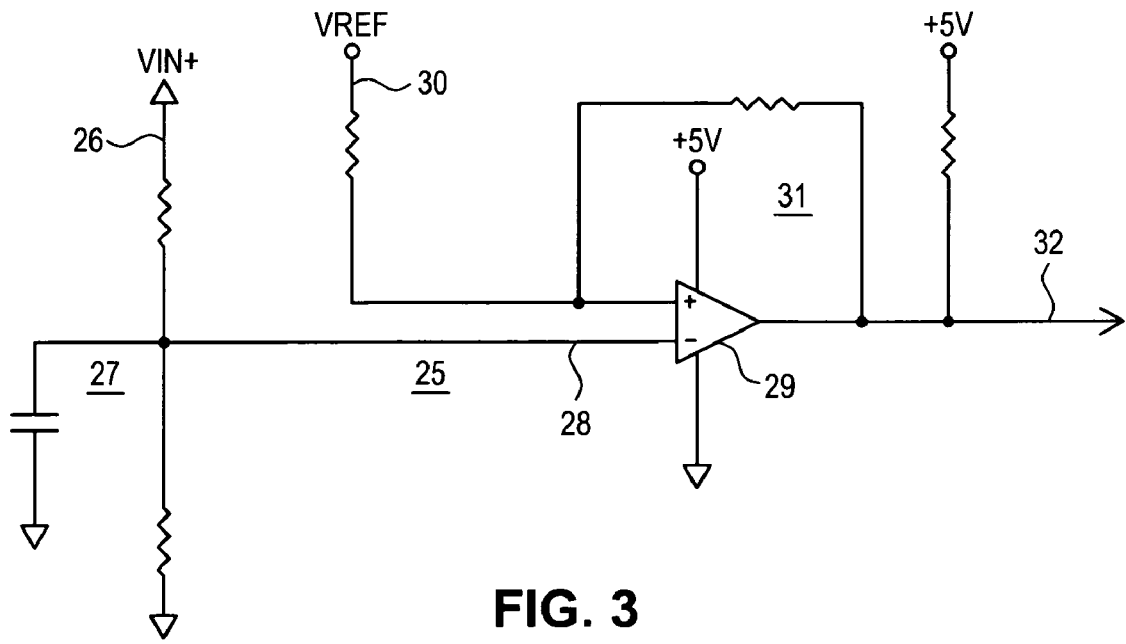
FIG. 3 is a schematic diagram of a circuit for implementing the low voltage detection and the high voltage detection components shown in FIG. 2.

FIG. 3 is a schematic diagram of a circuit 25 which can be used to implement the low voltage detection circuit 8 and the high voltage detection circuit 9 shown in FIG. 2. An input 26 (coupled to the power buss 7) is filtered and conditioned by the network 27 to produce a detected signal 28. The signal 28 is applied to the inverting input of an operational amplifier 29 which is configured as a comparator. The non-inverting input of the operational amplifier 29 is coupled to a reference voltage, at 30, in combination with an appropriate biasing network 31. The output 32 of the operational amplifier 29 then communicates with the control buss 19, as previously described. The circuit 25 can be configured to detect voltages that are less than a selected threshold, to implement the low voltage detection circuit 8, or to detect voltages that exceed a selected threshold, to implement the high voltage detection circuit 9, through proper selection of the reference voltage 30 and the biasing 31.

Figure 4:
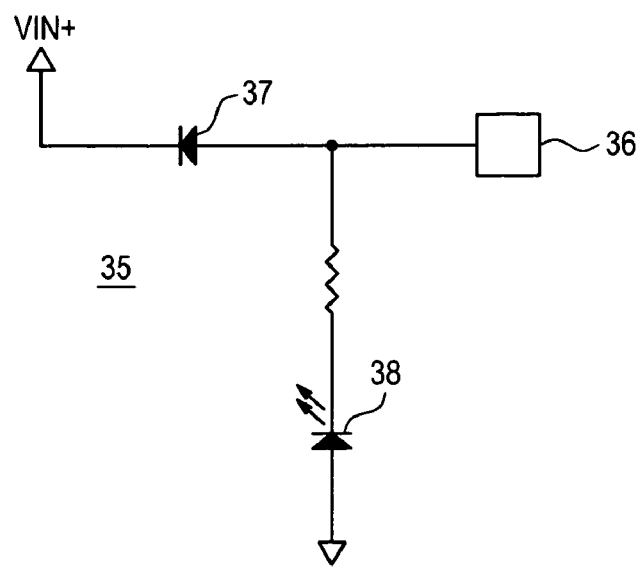
FIG. 4 is a schematic diagram of a circuit for implementing the reverse battery detection component shown in FIG. 2.

FIG. 4 is a schematic diagram of a circuit 35 which can be used to implement the reverse battery detection circuit 10 shown in FIG. 2. An input 36 (coupled with the main battery 3) is coupled to a diode 37. The diode 37 operates to prevent (block) power from being applied to the power supply 2 when negative voltages are present at the input 36 (corresponding to an incorrectly connected battery 3), and to pass power to the power supply 2 (VIN+) when positive voltages are present at the input 36 (corresponding to a properly connected battery 3). A light emitting diode (LED) 38 connects the input 36 to ground so that a negative voltage present at the input 36 will cause illumination of the LED 38, signifying an incorrect (reverse polarity) battery connection.

Figure 5A:
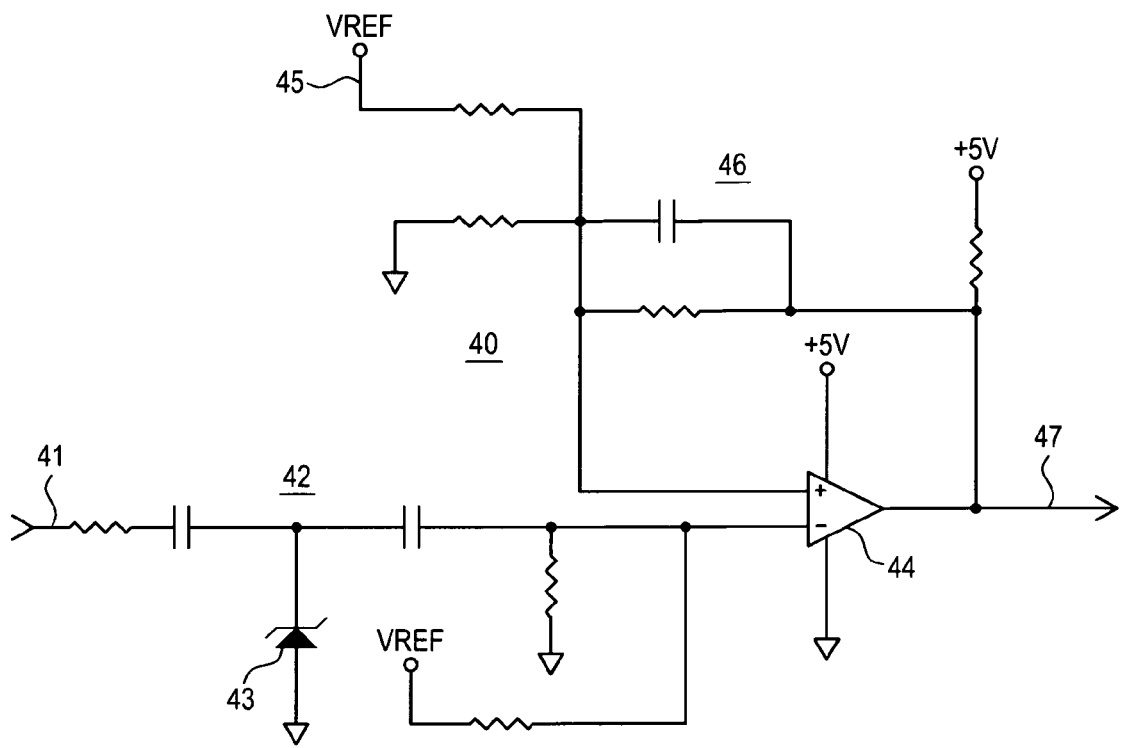
FIG. 5A is a schematic diagram of a circuit for implementing the vehicle running/spike detection component shown in FIG. 2.

FIG. 5A is a schematic diagram of a circuit 40 which can be used to implement the spike detecting component 11a of the vehicle running circuit 11 shown in FIG. 2. An input 41 (coupled with the power buss 7) communicates with a circuit 42 for detecting spikes (e.g., produced by an alternator associated with the vehicle's electrical system), and which additionally incorporates a Zener diode 43 for purposes of protecting the circuit 40 from surges (i.e., input protection). The circuit 42 is coupled to the inverting input of an operational amplifier 44 which is configured as a pulse detector. The non-inverting input of the operational amplifier 44 is coupled to a reference voltage, at 45, in combination with an appropriate biasing network 46. The output 47 of the operational amplifier 44 then communicates with the control buss 19, as previously described, providing the processor 20 with a pulse count.

The circuit 40 operates to detect charging noise (e.g., from the vehicle's alternator) associated with the supply side of the battery 3, and discriminates for minimum signal amplitude and pulse rise time. The processor 20 performs a digital filtering function, which will be discussed more fully below, to eliminate false triggers and erroneous noise spikes. To this end, the processor 20 performs an up/down increment count, preferably on a 71 mS window. If a charging pulse is detected in the previous 71 mS window, the processor 20 will count up. If no charging pulse is detected in the previous 71 mS window, the processor 20 will count down. A threshold (e.g., a count on the order of 100) is set to determine when a sufficient number of consecutive pulses have been detected, which will then indicate that the battery 3 is being charged (i.e., vehicle running). If the count proceeds to zero, the determination is made that the vehicle is not running. The processor 20 preferably includes settings for hysteresis in its algorithm to require multiple on and off detections before any action (signal out) is taken.

The spike detecting circuit 40 does not require any pulse forming of the input signal 41, and can operate over a wider bandwidth. This, in turn, allows the circuit 40 to monitor frequency pulses over a wider frequency range, improving operations of the circuit 40 responsive to variations in revolutions of the vehicle's motor (RPM's) relative to an analog detection circuit. The circuit 40 also permits such variations to be monitored for longer periods of time relative to an analog detection circuit.

Figure 5B:
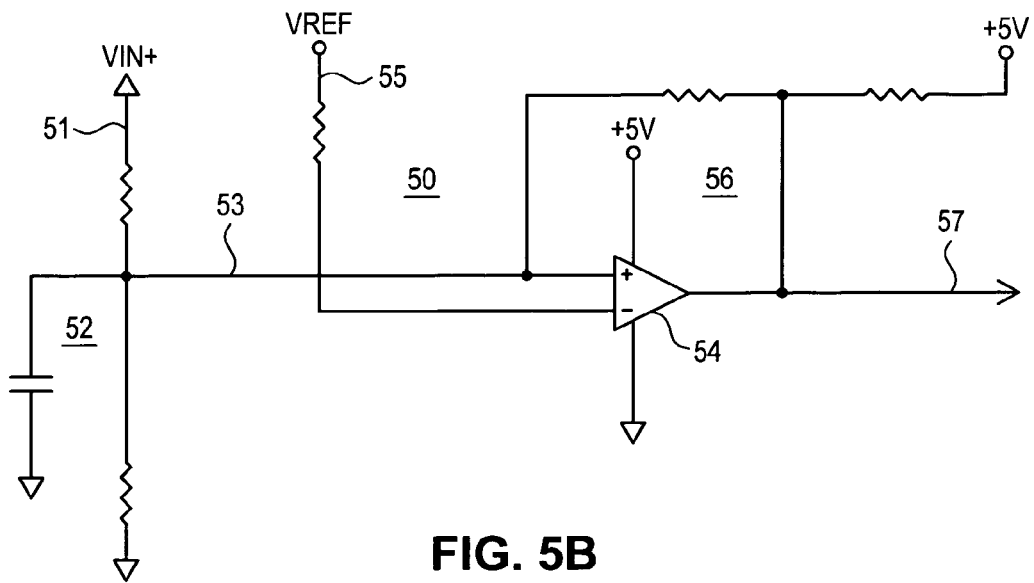
FIG. 5B is a schematic diagram of a circuit for implementing the vehicle running/voltage present component shown in FIG. 2.

To establish that a vehicle is running, the processor 20 also requires the detection of a battery voltage above a minimum charging threshold to indicate that the battery 3 is charging properly. FIG. 5B is a schematic diagram of a circuit 50 which can be used to implement the voltage detecting component 11b of the vehicle running circuit 11 shown in FIG. 2. An input 51 (coupled with the power buss 7) is filtered and conditioned by the network 52 to produce a detected signal 53. The signal 53 is applied to the non-inverting input of an operational amplifier 54 which is configured as a comparator. The inverting input of the operational amplifier 54 is coupled to a reference voltage, at 55, in combination with an appropriate biasing network 56. The output 57 of the operational amplifier 54 then communicates with the control buss 19, as previously described. Through proper selection of the reference voltage 55 and the biasing 56, the circuit 50 can be configured to detect voltages that exceed a selected threshold. This, in turn, provides an indication that the battery voltage is above a minimum charging threshold, indicating that the battery 3 is charging properly.

Figure 6:
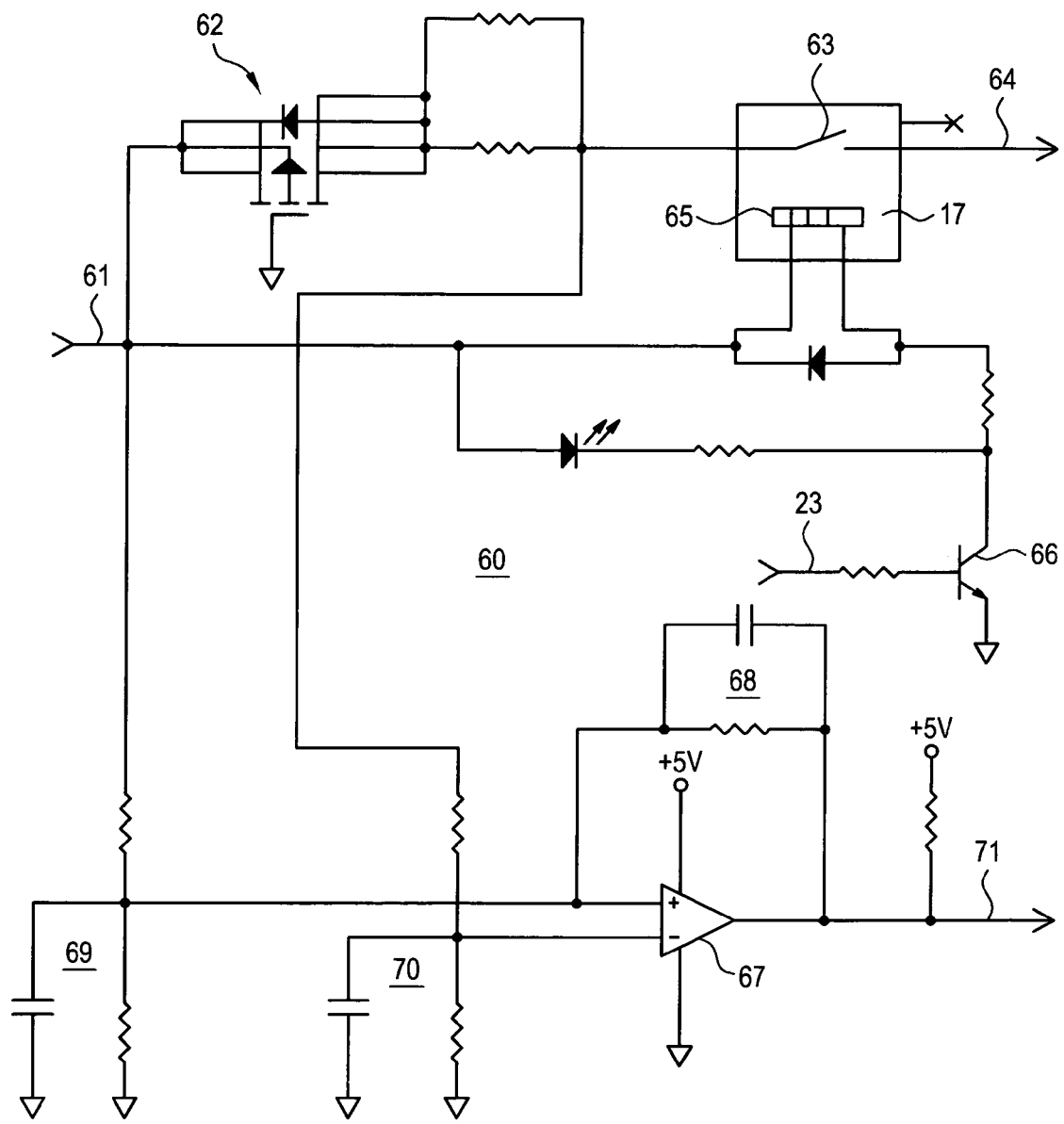
FIG. 6 is a schematic diagram of a circuit for implementing the reverse current detection component shown in FIG. 2.

FIG. 6 is a schematic diagram of a circuit 60 which can be used to implement the reverse current detection circuit 12 shown in FIG. 2. The circuit 60 receives an input 61 (coupled with the power buss 7) which is coupled to a series combination including a MOSFET 62 and the switch 63 of the relay 17. The output 64 of the switch 63 of the relay 17 is coupled with the back-up power buss 16, as previously described. The coil 65 of the relay 17 is connected between the input 61 (power in) and a transistor 66 coupled to ground. The transistor 66 is operated responsive to control signals received from the processor 20, via the output buss 23, in turn controlling operation of the relay switch 63.

The circuit 60 additionally includes an operational amplifier 67 which is configured as a comparator (responsive to the biasing network 68). The non-inverting and inverting inputs of the operational amplifier 67 are filtered and conditioned by the networks 69, 70, respectively, and are connected across the MOSFET 62. The non-inverting input of the operational amplifier 67 is coupled to the input 61. The inverting input of the operational amplifier 67 is coupled between the MOSFET 62 and the relay 17. The output 71 of the operational amplifier 67 communicates with the processor 20, as previously described.

The circuit 60 operates to monitor the forward bias of the MOSFET 62, and the processor 20 then monitors the output of the comparator 67 to determine if a drop-out of the main voltage (input 61, coupled with the battery 3) is occurring. A drop-out is determined to be present by the processor 20 if a combination of three conditions are present, those being that the relay 17 is engaged (active), the vehicle is not running (determined by the vehicle running circuit 11), and the MOSFET 62 is reverse biased (detected by the comparator 67).

FIGS. 7A through 7G provide a flow chart which shows the various operations performed by the processor 20 shown in FIG. 2. To this end, a programmable processor is preferably used to implement such logic, using a suitable programming language (e.g., "C") and using crystal locked timing functions. Such an implementation will typically have an accuracy of better than 1% over an operative range of temperature and time.

As previously indicated, control buss 19 electrically connects the outputs of the low voltage detection circuit 8, the high voltage detection circuit 9, the reverse battery detection circuit 10, the vehicle running circuit 11 (components 11a and 11b) and the reverse current detection circuit 12 with the processor 20. The processor 20 then monitors and filters the signals received from the control buss 19. The programming associated with the processor 20 includes filtering algorithms for determining when the battery 3 is charging, when the voltage on the battery 3 is low, when the voltage on the battery 3 is high, and when a voltage drop-out condition has occurred, indicating that the back-up battery 6 should then be utilized. If an "out of voltage" condition occurs, the processor 20 then operates to de-activate the relays 13, 17, as previously described.

The controlling software is preferably written in a cooperative tasking method having two operating threads. A first thread implements a state control section for managing the control functions of the processor 20 and, as a result, the overall system. Such management includes control of the major operating modes, such as detection that the vehicle (motor) is running, that the battery 3 is charging, when the vehicle (motor) is not running, and the amount of elapsed time since the vehicle (motor) stopped running, etc. These states implement logic steps such as the discontinuance of power to the timer after a selected period of time has passed (e.g., 30 minutes).

A second thread implements an interrupt-driven filtering and reverse or low battery voltage detection method. The filtering operates to ignore noise in the charging circuit and provides relatively large time constants (low pass filtering) with relatively fast input signals (high frequency). This is implemented by a state model with logic which determines that charging is occurring when charging pulses are detected over multiple, fast time periods. In essence, the processor 20 is continually operating to detect noise from the vehicle's alternator, which signifies that the battery 3 is charging. Single or non-repetitive noise, that is often present in automotive systems, is rejected. The processor 20 receives an interrupt signal if the battery 3 exhibits a voltage drop-out, and quickly disconnects the battery 3 from the battery powered equipment which is being supported, allowing the back-up battery 6 to maintain the voltage and current supply to the protected, battery powered equipment (i.e., the equipment 5 in FIGS. 1 and 2).

Figure 7A:
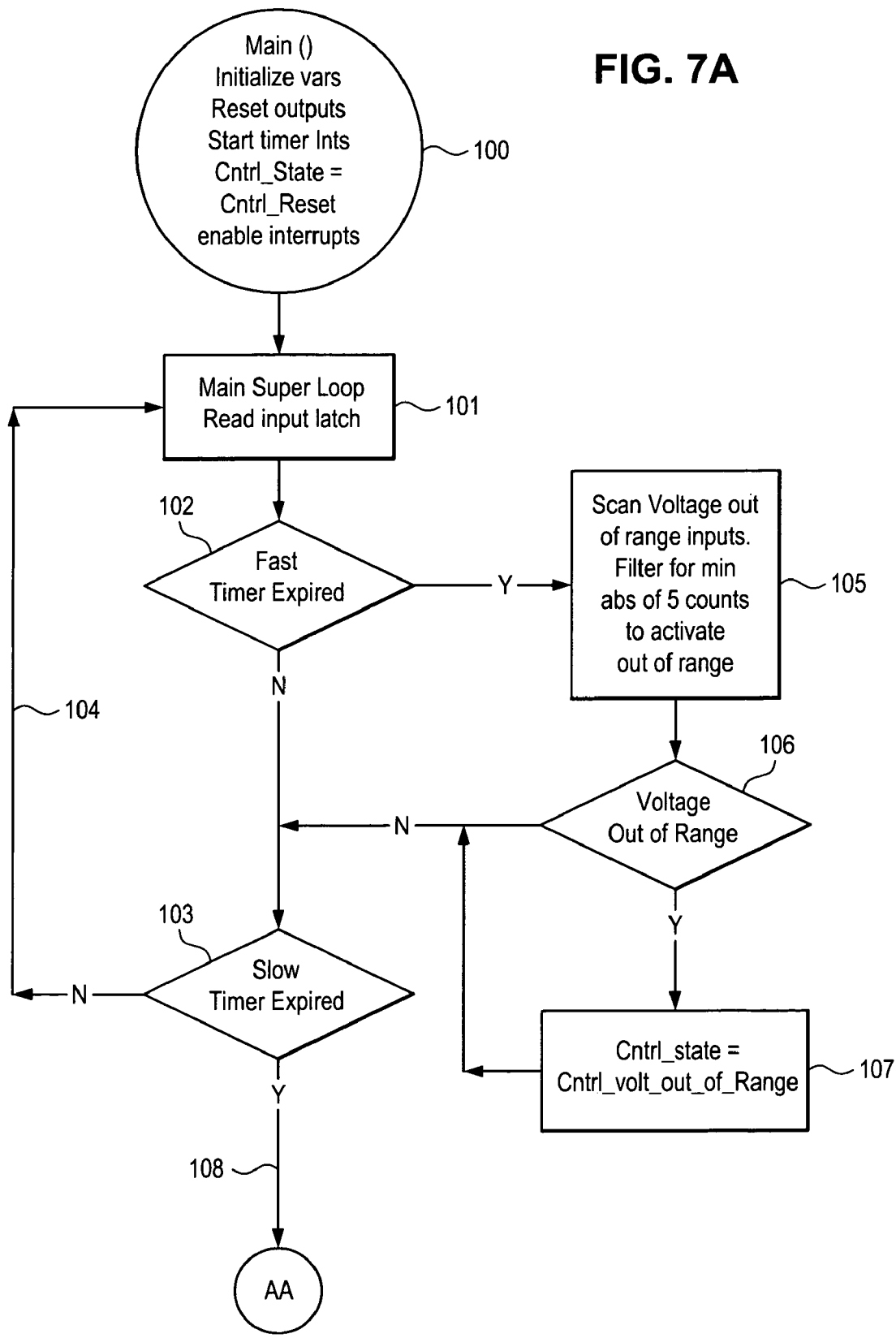
FIGS. 7A to 7G collectively illustrate a flow chart showing the operating steps performed by the processor shown in FIG. 2.
Figure 7B:
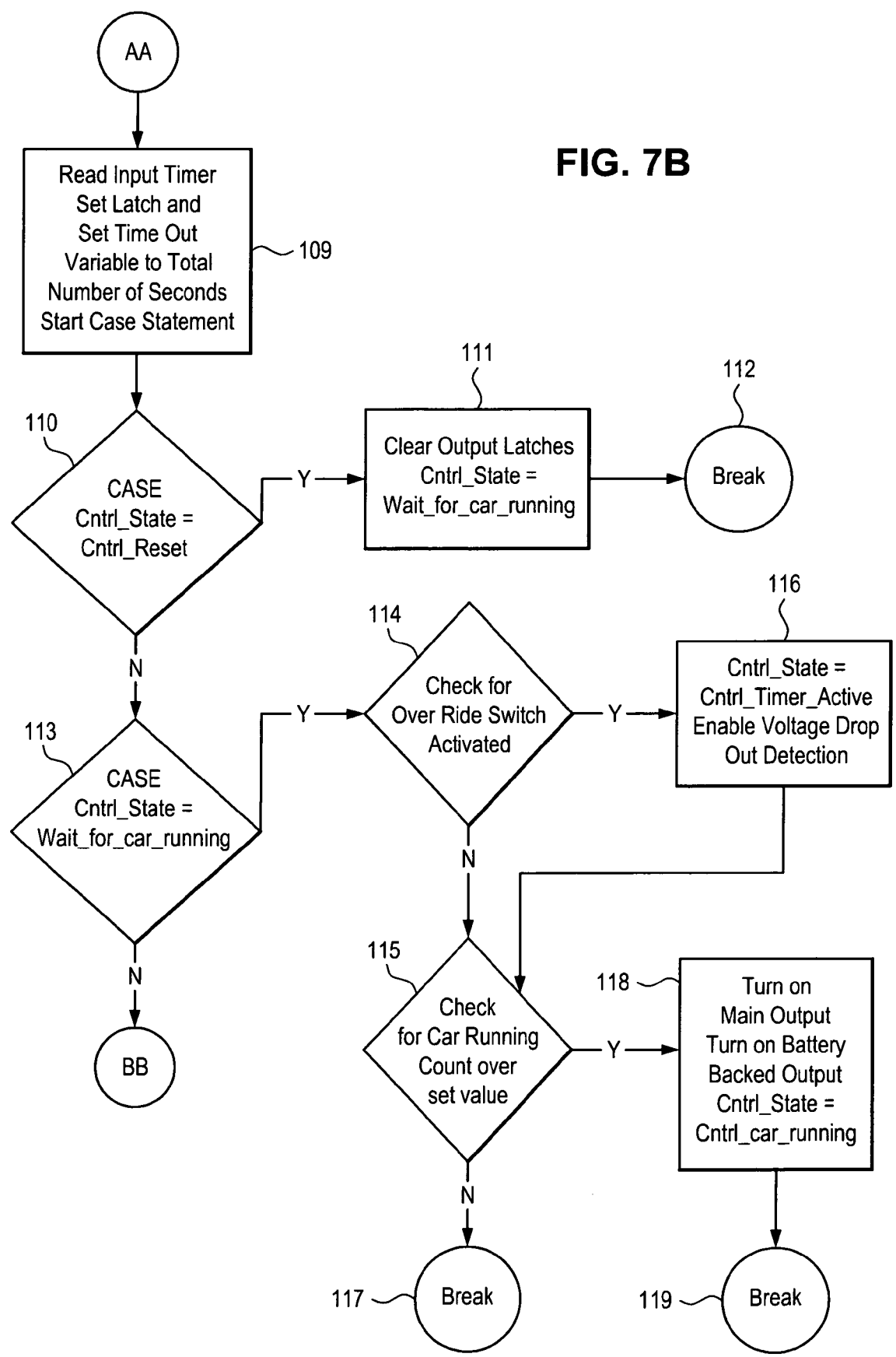

Referring to FIG. 7A, the routine to be performed by the processor 20 is initialized at 100. Such initialization operates to set the default conditions for the processor 20, allowing the processor to perform multiple tasks, and includes an initialization of variables and a reset of all output conditions (including the initialization of a case statement "Cntrl_State" to "Cntrl_Reset"), the starting of all timers (to be discussed more fully below), and enablement of the interrupt subroutines which are further described with reference to FIGS. 7F and 7G.

Following initialization, at 100, a main (super) loop is commenced. The main loop begins by reading an input latch, at 101, which contains the data supplied from the control buss 19, as previously described. A test is then performed, at 102, to determine whether a "Fast Timer" has expired. The Fast Timer is used to establish a relatively short period of time for evaluating the outputs received from the low voltage detection circuit 8 and the high voltage detection circuit 9, and the pulse stream received from the vehicle running circuit 11. If the test 102 is negative, a subsequent test (of a "Slow Timer", which will be further discussed below), at 103, will also be negative, which will then allow the test 102 to continue (the loop 104) until the test 102 is positive.

Following expiration of the period established by the Fast Timer, the inputs received from the low voltage detection circuit 8 and the high voltage detection circuit 9 are checked, at 105. These inputs are preferably filtered for a minimum of five occurrences that are out of range (i.e., too low or too high) before a final determination is made. A test is then performed, at 106, to determine whether the detected voltage is out of range. If not, the routine is continued by returning to the main loop (for subsequent data samplings). If a voltage is found to be out of range, the case statement is first changed to "Cntrl_volt_out_of_Range", at 107, and the routine is continued (returned to the main loop).

The foregoing operations will continue until the Slow Timer expires, at 108. The Slow Timer is used to establish a longer period of time, relative to the Fast Timer, for evaluating data and system responses for a longer period (or cycle). The longer period established by the Slow Timer is used, for example, to monitor the filtered data derived from the vehicle running circuit 11 (see FIG. 7G) and to establish the routine's various time-out periods. Upon expiration of the Slow Timer (test 103), and referring now to FIG. 7B, evaluation of the case statement is commenced, at 109, which additionally includes the reading of an "Input Timer Set Latch" and the setting of a "Time Out" variable to a selected period (e.g., to count a total number of seconds). This, in turn, operates to set the overall system timer and to set the control state for subsequent evaluation.

A test is then performed, at 110, to determine whether the case statement corresponds to "Cntrl_Reset". Because the case statement was initialized to this setting, at 100, the test 110 will initially be positive (during the first pass). This will then cause the Output Latches to be cleared, at 111. The case statement will also be changed to "Wait_for_car_running", and the routine will be returned to the main loop (FIG. 7A), at 112, for continued processing.

The subsequent test performed at 110 will then be negative, which will then be followed by another test, at 113. Because the case statement will then be "Wait_for_car_running", set at 111, this test will be positive and a check will then be made, at 114, to determine whether the override switch 21 has been activated. If not, the routine will proceed to the next test, at 115. If so, the case statement will be changed to "Cntrl_timer_active" and voltage drop-out detection will be enabled (see FIG. 7F), at 116, and the routine will then proceed to the test 115.

The test 115 operates to check whether the count established responsive to the pulses received from the vehicle running circuit 11 (FIG. 7G) has exceeded its set value (i.e., the previously mentioned count to 100). If not, the routine is returned to the main loop (FIG. 7A), at 117, for continued processing. If the test 115 is positive, the relays 13, 17 are activated (i.e., closed) and the case statement is changed to "Cntrl_car_running", at 118. The routine is then returned to the main loop (FIG. 7A), at 119, for continued processing.

Figure 7C:
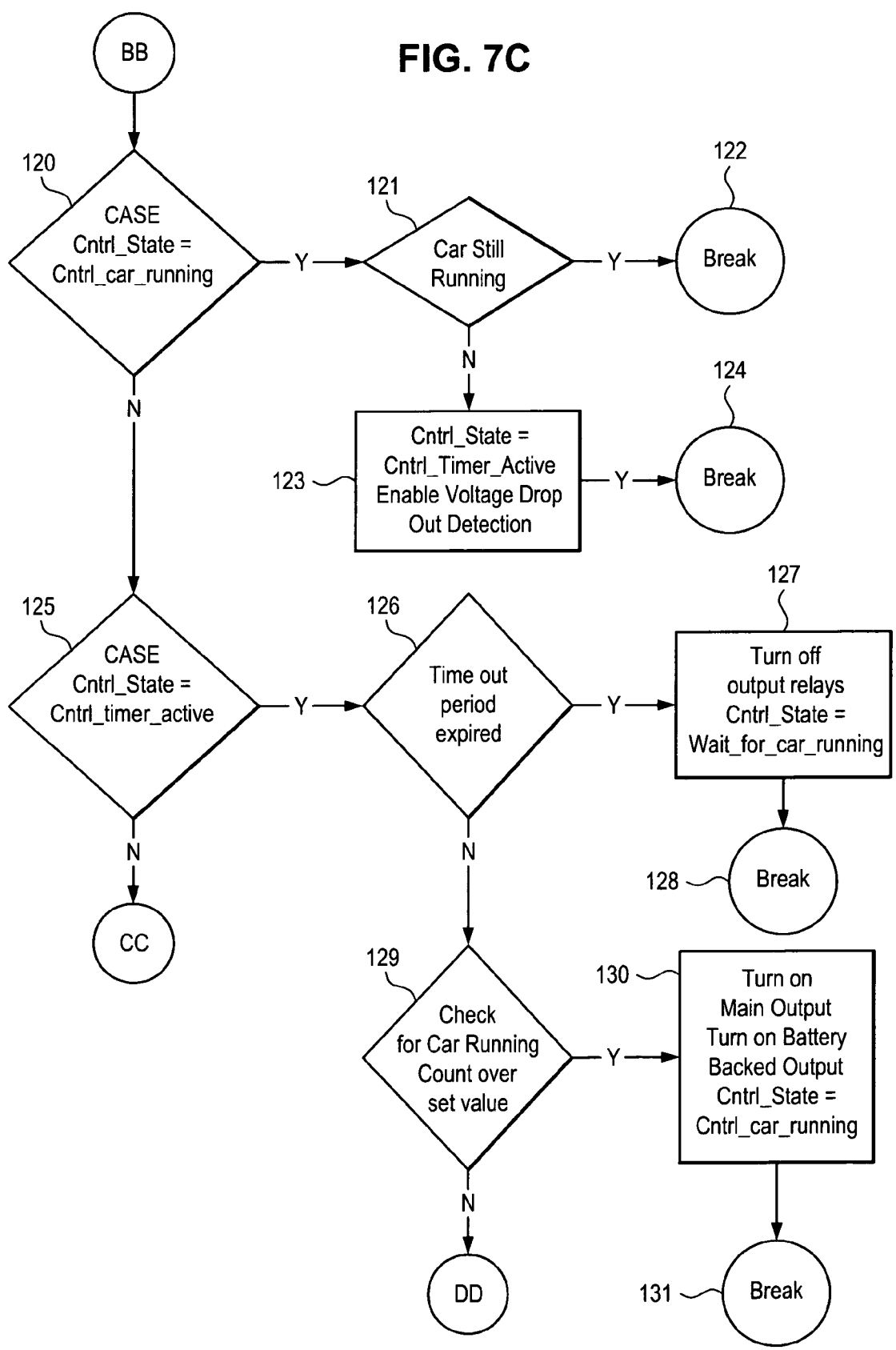

The subsequent test performed at 113 will then be negative which, referring now to FIG. 7C, will then be followed by another test, at 120. Because the case statement will then be "Cntrl_car_running", set at 118, this test will be positive and a check will then be made, at 121, to determine whether the vehicle continues to run (again responsive to signals received from the vehicle running circuit 11). If so, the routine is returned to the main loop (FIG. 7A), at 122, for continued processing. If the test 121 is negative, the case statement will be changed to "Cntrl_timer_active" and voltage drop-out detection will be enabled (FIG. 7F), at 123, and the routine is then returned to the main loop (FIG. 7A), at 124, for continued processing.

Resulting from the change made to the case statement, at 123 (or 116), the subsequent test performed at 120 will be negative, which will then be followed by another test, at 125. Because the case statement will then be "Cntrl_timer_active", this test will be positive and a check will then be made, at 126, to determine whether the time out period set at 109 has expired. If the test 126 is positive (signifying that the period allowed for continued connection of the equipment 4, 5 to the battery 3 has expired), the relays 13, 17 are deactivated (i.e., opened) and the case statement is changed to "Wait_for_car_running", at 127, and the routine is then returned to the main loop (FIG. 7A), at 128, for continued processing. To be noted is that the relay 17 will be deactivated (i.e., opened) by operations of the interrupt subroutine which is described more fully below, with reference to FIG. 7F, which serves to provide a fail-safe ("make sure") operation.

If the test 126 is negative, a test is performed, at 129, to again check whether the count established responsive to the pulses received from the vehicle running circuit 11 (FIG. 7G) has exceeded its set value (i.e., the previously mentioned count to 100). If the test 129 is positive, the relays 13, 17 are activated (i.e., closed) and the case statement is changed to "Cntrl_car_running", at 130, and the routine is then returned to the main loop (FIG. 7A), at 131, for continued processing.

Figure 7D:
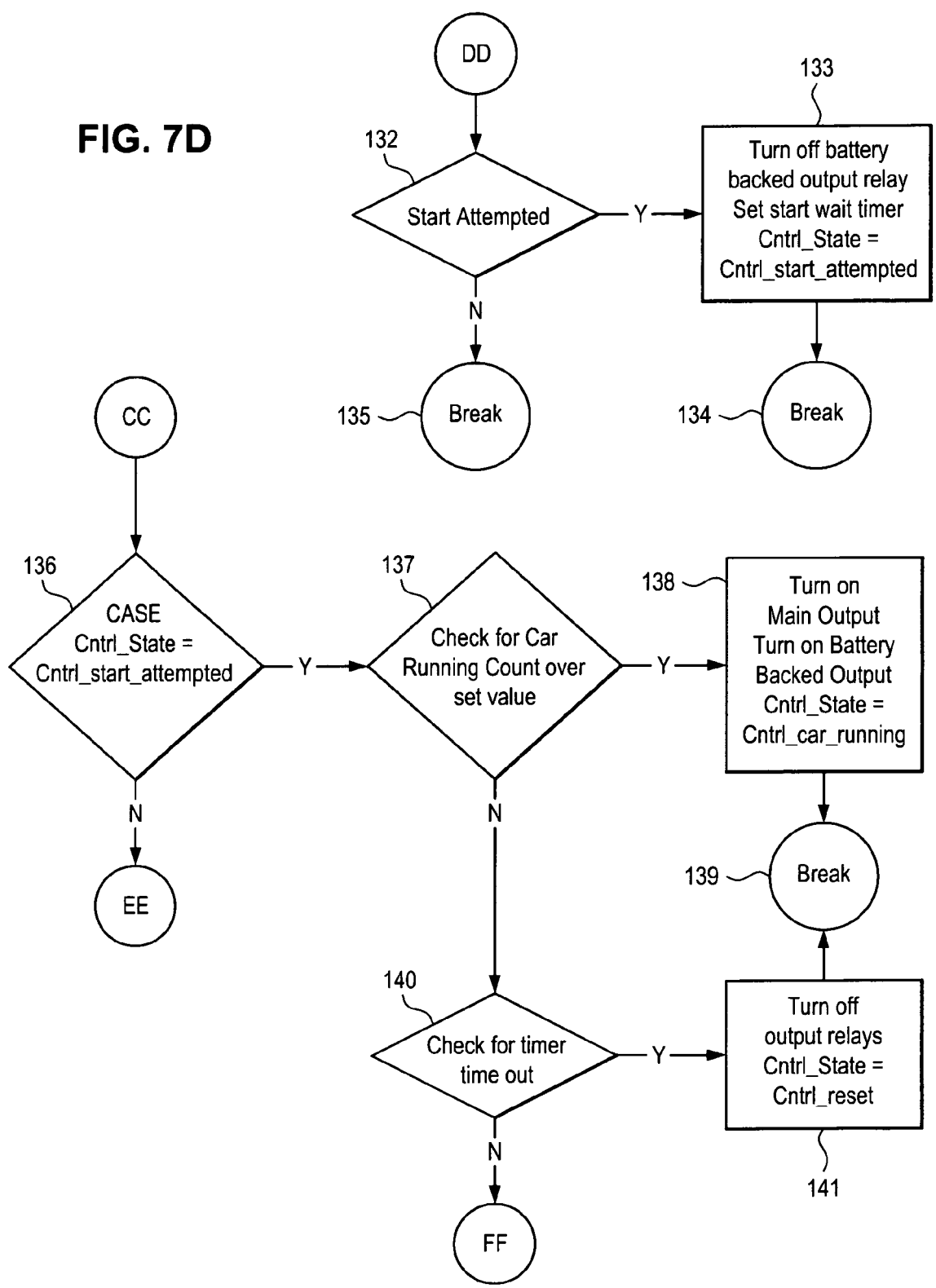

If the test 129 is negative, and referring now to FIG. 7D, a test is then performed, at 132, to determine whether it is being attempted to start the vehicle. To be noted is that, at this point, a problem with the vehicle's electrical system will already have been detected. If the test 132 is positive, the relay 17 is deactivated (i.e., opened), a "Start Wait Timer" is set to commence operation and the case statement is changed to "Cntrl_start_attempted", at 133, and the routine is then returned to the main loop (FIG. 7A), at 134, for continued processing. If the test 132 is negative, the routine is then returned to the main loop (FIG. 7A), at 135, for continued processing.

Resulting from the change made to the case statement, at 133, the subsequent test performed at 125 will be negative, which will then be followed by another test, at 136. Because the case statement will then be "Cntrl_start_attempted", this test will be positive and a check will then be made, at 137, to determine whether the count established responsive to the pulses received from the vehicle running circuit 11 (FIG. 7G) has exceeded its set value (i.e., the previously mentioned count to 100). If the test 137 is positive (signifying that the vehicle is running), the relays 13, 17 are activated (i.e., closed) and the case statement is changed to "Cntrl_car_running", at 138, and the routine is then returned to the main loop (FIG. 7A), at 139, for continued processing.

If the test 137 is negative, a check will then be made, at 140, to determine whether the time out period set at 109 has expired. If the test 140 is positive (signifying that the period allowed for continued connection of the equipment 4, 5 to the battery 3 has expired), the relays 13, 17 are deactivated (i.e., opened) and the case statement is changed to "Cntrl_Reset", at 141, and the routine is then returned to the main loop (FIG. 7A), at 139, for continued processing. To be noted is that this change in the case statement, to "Cntrl- _Reset", will operate to return the routine to the initialized case statement (at 100), essentially re-starting the foregoing routine.

Figure 7E:
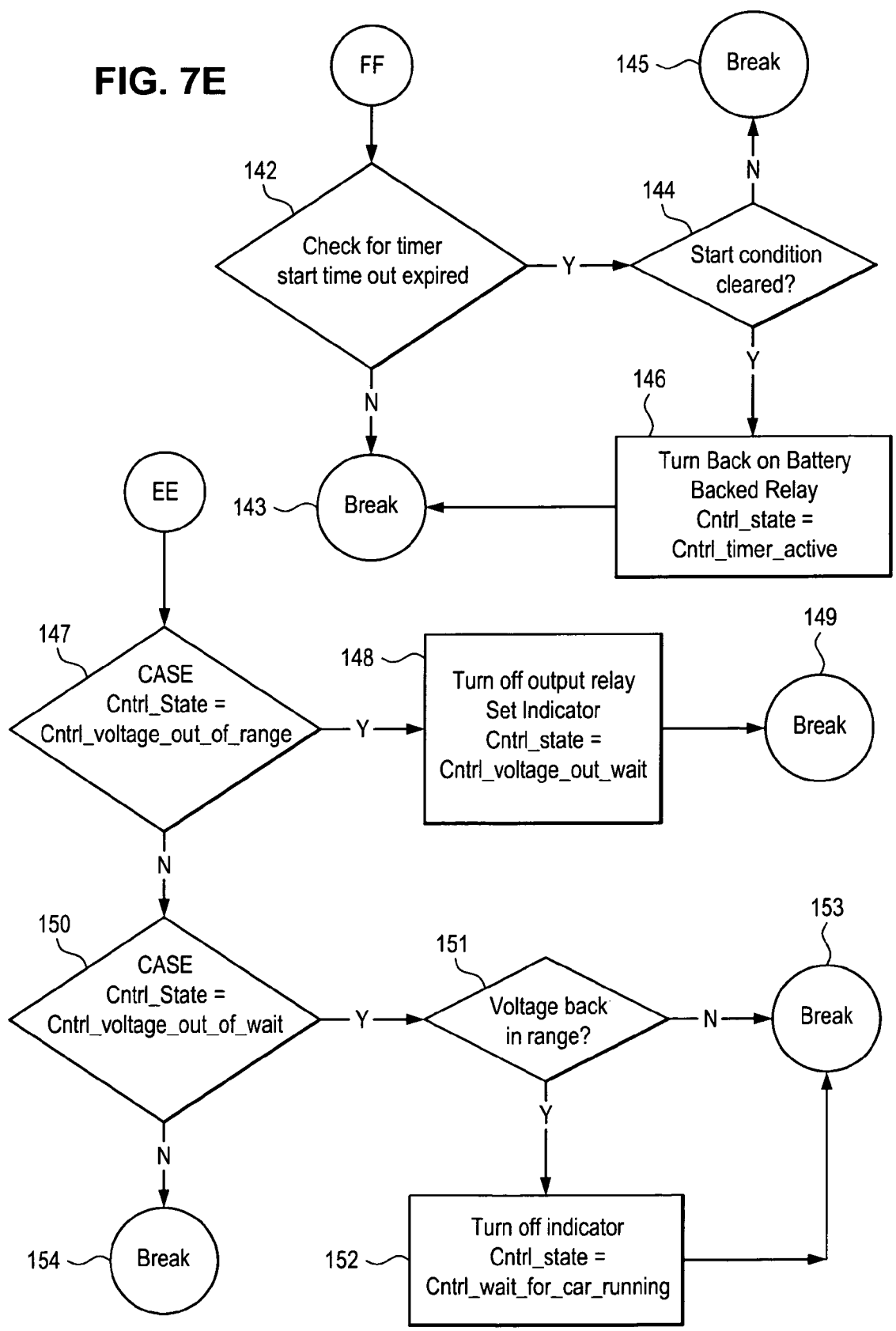

Referring now to FIG. 7E, if the test 140 is negative, a test is then performed, at 142, to determine whether the "Wait Timer" set at 133 has timed out (expired). If not, the routine is returned to the main loop (FIG. 7A), at 143, for continued processing. If the test 142 is positive, a test is then performed, at 144, to determine whether the attempt to start the vehicle which was identified by the test 132 (i.e., engine cranking) continues, or whether this attempt has been discontinued (which will then allow the voltage on the battery 3 to return to a nominal level). This test is performed to avoid monitoring of the entire cranking process, where the battery voltage will tend to rise and fall as the starter motor is operated (cranked). If it is determined that cranking continues (a negative test 144), the routine is returned to the main loop (FIG. 7A), at 145, for continued processing. If it is determined that the cranking has been discontinued (a positive test 144), the relay 17 is reactivated (i.e., closed) and the case statement is changed to "Cntrl_timer_active", at 146, and the routine is then returned to the main loop (FIG. 7A), at 143, for continued processing. To be noted is that subsequent attempts to start the vehicle will cause the foregoing to be repeated, as necessary.

If the test performed at 136 is negative, a further test is performed, at 147, to determine if the case statement is then set to "Cntrl_voltage_out_of_Range" (set at 107). If the test 147 is positive, the relays 13, 17 are deactivated (i.e., opened), an indicator (e.g., an LED) is set to advise that the battery voltage has been determined to be out of range and the case statement is changed to "Cntrl_voltage_out_wait", at 148. The routine is then returned to the main loop (FIG. 7A), at 149, for continued processing.

Resulting from the change made to the case statement, at 148, the subsequent test performed at 147 will be negative, which will then be followed by another test, at 150. Because the case statement will then be "Cntrl_voltage_out_wait", this test will be positive and a check will then be made, at 151, to determine whether the voltage has returned to a proper range (determined at 106). If the test 151 is positive (voltage in a proper range), the indicator set at 148 is turned off and the case statement is changed to "Cntrl_wait_for_car_running", which can then be detected by subsequent operations of the previously described test 113. The routine is then returned to the main loop (FIG. 7A), at 153, for continued processing. If the test 151 is negative (voltage not yet back in range), the routine is returned to the main loop (FIG. 7A), at 153, for continued processing.

If the test 150 is negative, the routine is returned to the main loop (FIG. 7A), at 154, for continuation of the above described processing.

Figure 7F:
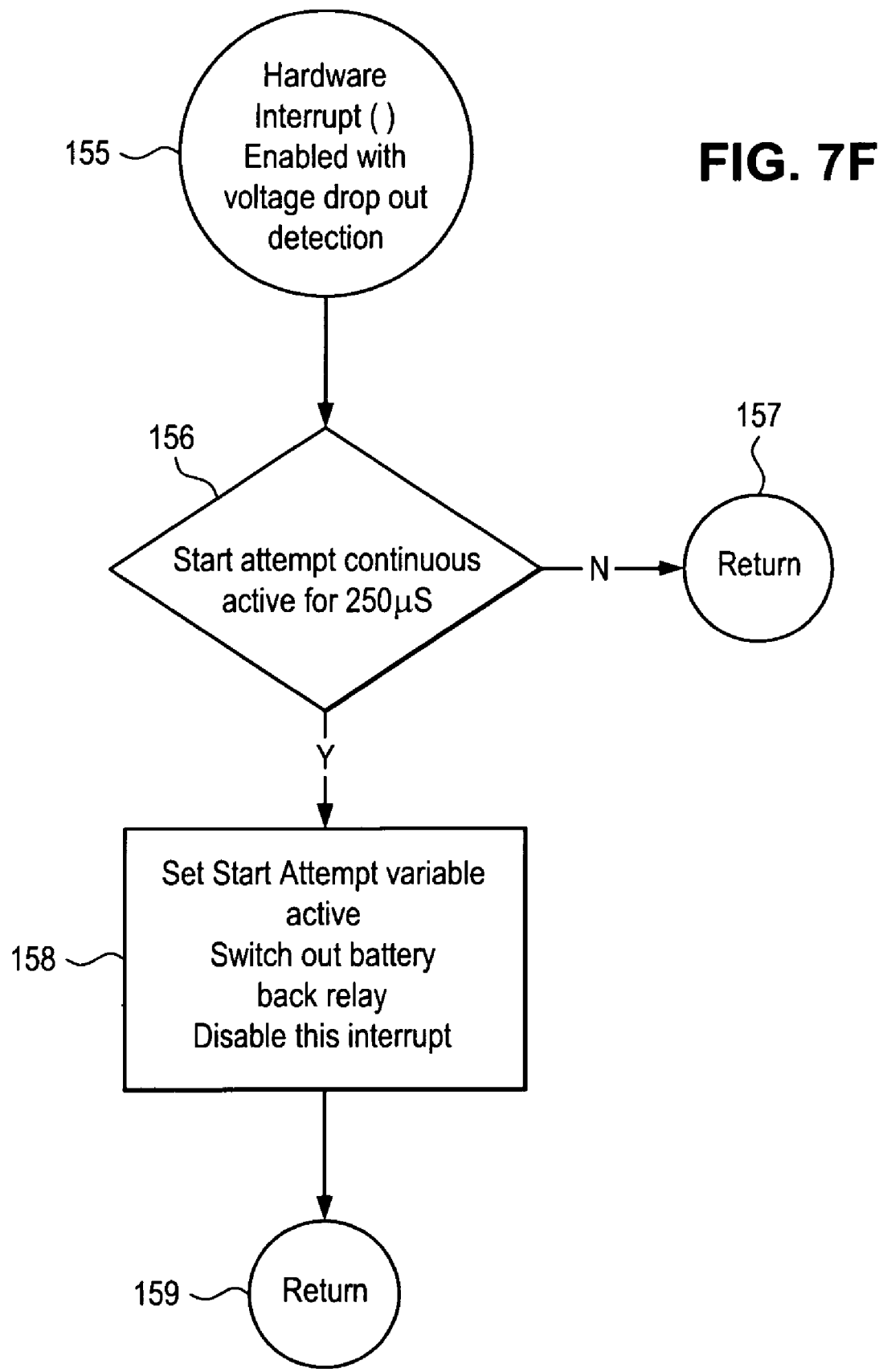

FIG. 7F shows an interrupt service subroutine 155 which operates to determine whether a detected drop in battery voltage is the result of an attempt to start the vehicle (a true drop-out), or the result of the activation of another piece of equipment associated with the vehicle (i.e., noise, which is not a true drop-out). As previously indicated, the interrupt service subroutine 155 would be called into play in conjunction with the operations 116, 123.

In operation, a test is performed, at 156, to determine whether a detected drop in voltage remains present for a set period of time (e.g., 250 μS). If not, a determination is made that the detected drop-out is a transient resulting from the activation of another piece of equipment associated with the vehicle (e.g., a radio) and the subroutine returns to the main routine (i.e., at 116 or 123), at 157, for continued processing.

If the detected drop in voltage is found to exceed the set time period, the "Start Attempt" variable is set to indicate that the detected drop in voltage is a drop-out resulting from an attempt to start the vehicle (i.e., the case statement is changed to "Cntrl_start_attempted", at 133; note, also, the test performed at 144), the relay 17 is deactivated (i.e., opened) and the interrupt service subroutine 155 is ended, at 158. The subroutine 155 then returns to the main routine (i.e., at 116 or 123), at 159, for continued processing.

Figure 7G:
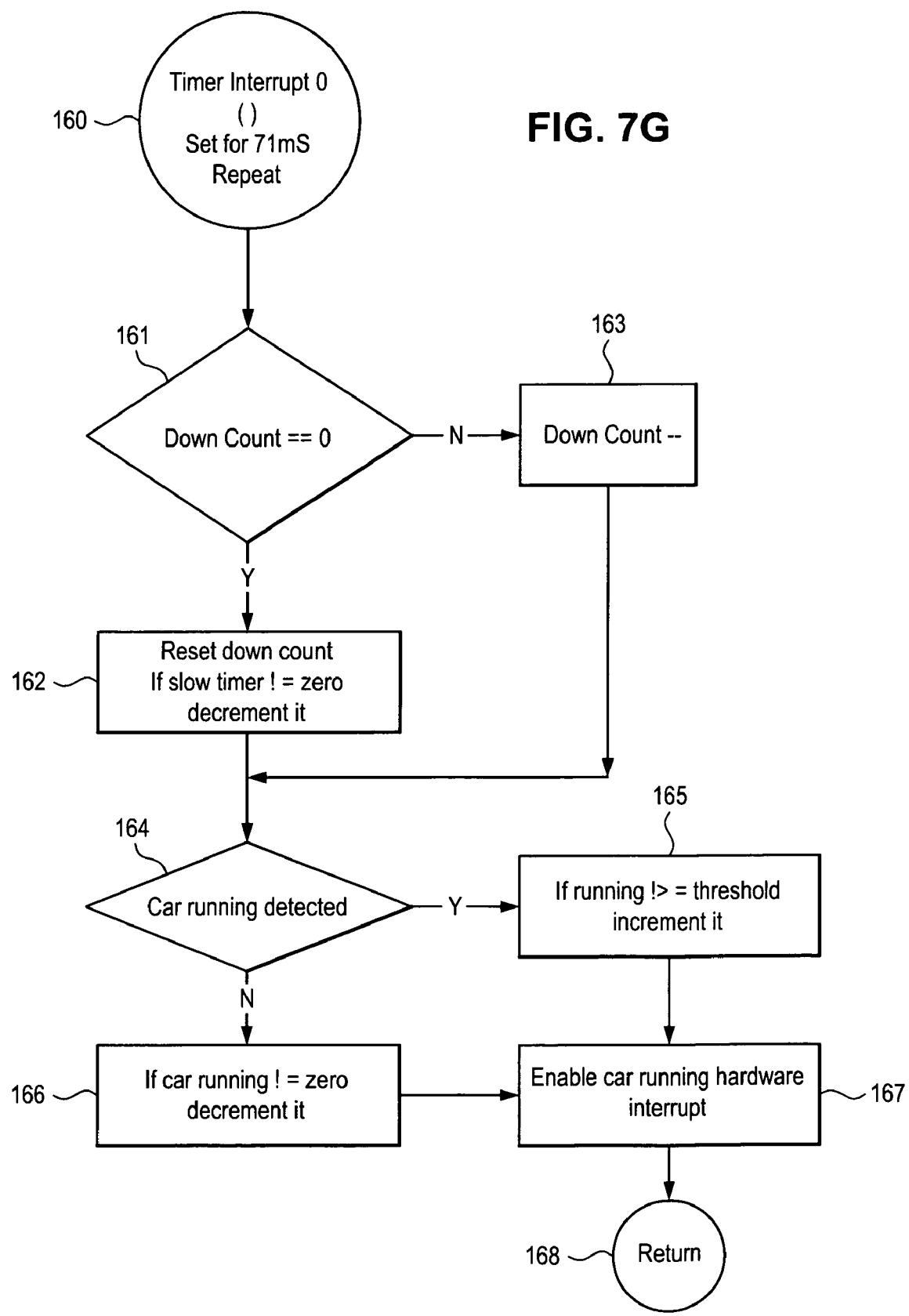

FIG. 7G shows a timer interrupt subroutine 160 which operates to perform the filtering which is used to determine when the vehicle is running. As previously indicated, the timer interrupt subroutine 160 would be called into play in conjunction with the operations 115, 129, 137.

In operation, the window for the interrupt (e.g., the previously described 71 mS window) is set, at 160. A test is then performed, at 161, to determine whether a "Down Count" which is being performed by the timer interrupt subroutine 160 has reached a zero value. To be noted is that the Down Count will have previously been set to the desired maximum count (e.g., the previously described count of 100) during the initialization, at 100, with the result being that the test 161 will operate to monitor the vehicle running circuit 11 during each of a series of 71 mS periods (e.g., up to 1 second). If the test 161 is positive, the Down Count is reset (e.g., to the preferred count of 100) and the Slow Timer used in conjunction with the test 103 is decremented (by 1) if the Slow Timer then has a zero value, at 162. To be noted is that the action performed on the Slow Timer by the operation 162 will operate to set a flag and indicate that the (longer) count (preferably having a terminal low value of zero and a programmable, terminal high value of 42) being performed by the Slow Timer has timed out. If the test 161 is negative, the Down Count is decremented (by 1), at 163.

Irrespective of the outcome of the test 161, a test is then performed, at 164, to determine if the vehicle is running (responsive to the vehicle running circuit 11). If so, the Down Count is incremented (by 1), at 165. If not, the Down Count is decremented (by 1), at 166. The interrupt service subroutine 155 is then enabled, at 167, followed by return of the subroutine 160 to the main routine (i.e., at 115, 129 or 137), at 168, for continued processing.

It will be understood that various changes in the details, materials and arrangement of parts which have been herein described and illustrated in order to explain the nature of this invention may be made by those skilled in the art within the principle and scope of the invention as expressed in the following claims. For example, although relays (13, 17) have been disclosed for use in coupling the power supply 2 with the timed equipment 4 and the protected equipment 5, other switching devices, such as solid state switching devices, can similarly be used for such purposes. The several circuits 25, 35, 40, 50 and 60 disclosed for implementing the low voltage detection circuit 8, the high voltage detection circuit 9, the reverse battery detection circuit 10, the spike detecting and voltage detecting components of the vehicle running circuit 11 and the reverse current detection circuit 12, are also illustrative, and can be varied to achieve similar results. It is also possible to add functions, to alter functions, or to delete some of the overall functions performed by these circuit components, if desired, including variation of the operational steps performed by the processor 20. As an example, a permanent connection (the buss 16) has previously been described for coupling the back-up battery 6 with the protected equipment 5. As an alternative, the back-up battery 6 can be coupled with the protected equipment 5 (and/or the power supply 2) using a switched connection (e.g., a relay connecting the back-up battery 6 and the buss 16) so that the back-up battery 6 can be selectively removed from the remainder of the system 1 to protect against a complete discharge of the back-up battery 6, if desired. Other variations are also possible, and can be made to meet the requirements of a particular application.

What is claimed is:

1. An uninterruptible power supply circuit for selectively connecting a direct current source to equipment which is to be operated by the direct current source, comprising:
    a first switch for selectively connecting the direct current source to first equipment having operative components which can be electrically disconnected without a loss of function;
    a second switch for selectively connecting the direct current source to second equipment having operative components which can exhibit a loss of function when electrically disconnected;
    a battery, separate from the direct current source and electrically coupled with the second equipment, wherein the battery provides direct current for operating the second equipment when the second equipment is disconnected from the direct current source; and
    a processor electrically coupled with the first switch and with the second switch, wherein the processor activates and deactivates the first switch and the second switch to selectively connect the direct current source with the first equipment and with the second equipment and to disconnect the direct current source from the first equipment and from the second equipment after a prescribed period of time has been counted, so that the second equipment remains connected to the battery after the second equipment has been disconnected from the direct current source.

2. The circuit of claim 1 wherein the first switch is a relay.

3. The circuit of claim 1 wherein the second switch is a relay.

4. The circuit of claim 1 wherein the battery is a deep cycle storage battery.

5. The circuit of claim 1 wherein the battery is continuously electrically coupled with the second equipment.

6. The circuit of claim 1 wherein the processor is a programmable data-processing device.

7. The circuit of claim 1 which further includes an electrical circuit which monitors current passing between the direct current source and the second equipment.

8. The circuit of claim 7 wherein the circuit which monitors the current passing between the direct current source and the second equipment produces a first signal when the current is passing from the direct current source to the second equipment, and a second signal when the current is not passing from the direct current source to the second equipment.

9. The circuit of claim 8 wherein the second switch is opened responsive to the second signal.

10. The circuit of claim 9 wherein the circuit which monitors the current passing between the direct current source and the second equipment is electrically coupled with the processor, and wherein the processor activates and deactivates the second switch.

11. The circuit of claim 1 which further includes an electrical circuit which monitors the voltage produced by the direct current source.

12. The circuit of claim 11 wherein the circuit which monitors the voltage produced by the direct current source produces an output signal when the voltage drops below a first threshold voltage.

13. The circuit of claim 11 wherein the circuit which monitors the voltage produced by the direct current source produces an output signal when the voltage exceeds a second threshold voltage.

14. The circuit of claim 11 wherein the circuit which monitors the voltage produced by the direct current source produces an output signal when the voltage has a polarity which is opposite to a polarity necessary for operating the equipment which is to be operated by the direct current source.

15. The circuit of claim 11 wherein the second switch is opened responsive to an output signal received from the circuit which monitors the voltage produced by the direct current source.

16. The circuit of claim 15 wherein the first switch is opened responsive to the output signal received from the circuit which monitors the voltage produced by the direct current source.

17. The circuit of claim 11 wherein the circuit which monitors the voltage produced by the direct current source is electrically coupled with the processor, and wherein the processor activates and deactivates the first switch and the second switch responsive to output signals received from the circuit which monitors the voltage produced by the direct current source.

18. The circuit of claim 1 which further includes a timer for counting the period of time during which the equipment which is to be operated by the direct current source is to remain connected to the direct current source.

19. The circuit of claim 18 which further includes an interval switch coupled with the timer, for establishing the period of time counted by the timer.

20. The circuit of claim 18 wherein the processor incorporates the timer.

21. The circuit of claim 18 wherein the direct current source includes a battery, and a generator for charging the battery when the generator is in operation, and wherein the timer is started when the generator is not in operation.

22. The circuit of claim 21 wherein the timer produces a change in state when the period of time is counted, and wherein the first switch and the second switch are opened responsive to the change in state of the timer.

23. The circuit of claim 22 which further includes an electrical circuit coupled with the generator which monitors operation of the generator.

24. The circuit of claim 23 wherein the circuit which monitors the operation of the generator produces an output signal when the generator produces a detected output signal.

25. The circuit of claim 24 wherein the generator produces a plurality of voltage spikes when the generator is in operation, and wherein the detected output signal corresponds to a count of the voltage spikes which exceeds a threshold count.

26. The circuit of claim 25 wherein the circuit which monitors the operation of the generator produces the output signal when the battery produces a voltage which exceeds a threshold voltage.

27. The circuit of claim 26 wherein the first switch and the second switch are closed responsive to the output signal received from the circuit which monitors the operation of the generator.

28. The circuit of claim 27 wherein the timer and the circuit which monitors the operation of the generator are electrically coupled with the processor, and wherein the processor activates and deactivates the first switch and the second switch responsive to the timer and the output signal received from the circuit which monitors the operation of the generator.

29. The circuit of claim 1 which further includes an override switch coupled with the processor, wherein activation of the override switch alters operations of the processor.

30. The circuit of claim 29 wherein activation of the override switch causes the processor to close the first switch and the second switch.

31. A system including a first battery, equipment which is to be operated by direct current from the first battery, and an uninterruptible power supply circuit for selectively connecting the first battery to the equipment, comprising:
- a first switch for selectively connecting the first battery to first equipment having operative components which can be electrically disconnected without a loss of function;
- a second switch for selectively connecting the first battery to second equipment having operative components which can exhibit a loss of function when electrically disconnected;
- a second battery, separate from the first battery and electrically coupled with the second equipment, wherein the second battery provides direct current for operating the second equipment when the second equipment is disconnected from the first battery; and
- a processor electrically coupled with the first switch and with the second switch, wherein the processor activates and deactivates the first switch and the second switch to selectively connect the first battery with the first equipment and with the second equipment and to disconnect the first battery from the first equipment and from the second equipment after a prescribed period of time has been counted, so that the second equipment remains connected to the second battery after the second equipment has been disconnected from the first battery.

32. The system of claim 31 wherein the first switch is a relay.

33. The system of claim 31 wherein the second switch is a relay.

34. The system of claim 31 wherein the first battery is a storage battery.

35. The system of claim 31 wherein the second battery is a deep cycle storage battery.

36. The system of claim 31 wherein the second battery is continuously electrically coupled with the second equipment.

37. The system of claim 31 wherein the second equipment includes volatile memory capable of the loss of function when electrically disconnected from the first battery.

38. The system of claim 31 wherein the second equipment includes operating portions that must be re-started after being electrically disconnected from the first battery.

39. The system of claim 31 wherein the processor is a programmable data-processing device.

40. The system of claim 31 which further includes an electrical circuit which monitors current passing between the first battery and the second equipment.

41. The system of claim 40 wherein the circuit which monitors the current passing between the first battery and the second equipment produces a first signal when the current is passing from the first battery to the second equipment, and a second signal when the current is not passing from the first battery to the second equipment.

42. The system of claim 41 wherein the second switch is opened responsive to the second signal.

43. The system of claim 42 wherein the circuit which monitors the current passing between the first battery and the second equipment is electrically coupled with the processor, and wherein the processor activates and deactivates the second switch.

44. The system of claim 31 which further includes an electrical circuit which monitors the voltage produced by the first battery.

45. The system of claim 44 wherein the circuit which monitors the voltage produced by the first battery produces an output signal when the voltage drops below a first threshold voltage.

46. The system of claim 44 wherein the circuit which monitors the voltage produced by the first battery produces an output signal when the voltage exceeds a second threshold voltage.

47. The system of claim 44 wherein the circuit which monitors the voltage produced by the first battery produces an output signal when the voltage has a polarity which is opposite to a polarity necessary for operating the equipment which is to be operated by the first battery.

48. The system of claim 44 wherein the second switch is opened responsive to an output signal received from the circuit which monitors the voltage produced by the first battery.

49. The system of claim 48 wherein the first switch is opened responsive to the output signal received from the circuit which monitors the voltage produced by the first battery.

50. The system of claim 44 wherein the circuit which monitors the voltage produced by the first battery is electrically coupled with the processor, and wherein the processor activates and deactivates the first switch and the second switch responsive to output signals received from the circuit which monitors the voltage produced by the first battery.

51. The system of claim 31 which further includes a timer for counting the period of time during which the equipment which is to be operated by the first battery is to remain connected to the first battery.

52. The system of claim 51 which further includes an interval switch coupled with the timer, for establishing the period of time counted by the timer.

53. The system of claim 51 wherein the processor incorporates the timer.

54. The system of claim 51 which further includes a generator for charging the first battery when the generator is in operation, and wherein the timer is started when the generator is not in operation.

55. The system of claim 54 wherein the timer produces a change in state when the period of time is counted, and wherein the first switch and the second switch are opened responsive to the change in state of the timer.

56. The system of claim 55 which further includes an electrical circuit coupled with the generator which monitors operation of the generator.

57. The system of claim 56 wherein the circuit which monitors the operation of the generator produces an output signal when the generator produces a detected output signal.

58. The system of claim 57 wherein the generator produces a plurality of voltage spikes when the generator is in operation, and wherein the detected output signal corresponds to a count of the voltage spikes which exceeds a threshold count.

59. The system of claim 58 wherein the circuit which monitors the operation of the generator produces the output signal when the first battery produces a voltage which exceeds a threshold voltage.

60. The system of claim 59 wherein the first switch and the second switch are closed responsive to the output signal received from the circuit which monitors the operation of the generator.

61. The system of claim 60 wherein the timer and the circuit which monitors the operation of the generator are electrically coupled with the processor, and wherein the processor activates and deactivates the first switch and the second switch responsive to the timer and the output signal received from the circuit which monitors the operation of the generator.

62. The system of claim 31 which further includes an override switch coupled with the processor, wherein activation of the override switch alters operations of the processor.

63. The system of claim 62 wherein activation of the override switch causes the processor to close the first switch and the second switch.

64. A mobile site incorporating the system of claim 31.

65. The mobile site of claim 64 wherein the mobile site is a vehicle incorporating the first battery and housing the equipment which is to be operated by the direct current from the first battery.

66. A process for supplying uninterrupted power to equipment which is to be operated by a direct current source, including first equipment having operative components which can be electrically disconnected without a loss of function and second equipment having operative components which can exhibit a loss of function when electrically disconnected, comprising the steps of:
  connecting the direct current source with the first equipment using a first switch;
  connecting the direct current source with the second equipment using a second switch;
  electrically coupling a battery which is separate from the direct current source with the second equipment, providing direct current for operating the second equipment when the second equipment is disconnected from the direct current source; and
  operating the first switch and the second switch to selectively connect the direct current source with the first equipment and with the second equipment and to disconnect the direct current source from the first equipment and from the second equipment after a prescribed period of time has been counted:
  whereby the second equipment will remain connected to the battery after the second equipment has been disconnected from the direct current source.

67. The process of claim 66 which further includes the step of continuously electrically coupling the battery with the second equipment.

68. The process of claim 66 wherein the process is performed responsive to a programmable data-processing device.

69. The process of claim 66 which further includes the step of monitoring current passing between the direct current source and the second equipment.

70. The process of claim 69 wherein the monitoring includes the steps of producing a first signal when the current is passing from the direct current source to the second equipment, and producing a second signal when the current is not passing from the direct current source to the second equipment.

71. The process of claim 70 which further includes the step of opening the second switch responsive to the second signal.

72. The process of claim 66 which further includes the step of monitoring the voltage produced by the direct current source.

73. The process of claim 72 which further includes the step of producing an output signal when the voltage drops below a first threshold voltage.

74. The process of claim 73 which further includes the steps of testing to determine whether the voltage has dropped below the first threshold voltage for the prescribed period of time, and producing the output signal when the voltage drops below the first threshold voltage for the prescribed period of time.

75. The process of claim 72 which further includes the step of producing an output signal when the voltage exceeds a second threshold voltage.

76. The process of claim 72 which further includes the step of producing an output signal when the voltage has a polarity which is opposite to a polarity necessary for operating the equipment which is to be operated by the direct current source.

77. The process of claim 66 which further includes the step of opening the second switch responsive to the monitoring of a voltage which is unacceptable for operation of the second equipment.

78. The process of claim 77 which further includes the step of opening the first switch responsive to the monitoring of a voltage which is unacceptable for operation of the first equipment.

79. The process of claim 66 which further includes the step of counting the period of time during which the equipment which is to be operated by the direct current source is to remain connected to the direct current source.

80. The process of claim 79 wherein the period of time is variably selectable.

81. The process of claim 79 wherein the direct current source includes a battery, and a generator for charging the battery when the generator is in operation, and wherein the process further includes the step of starting a timer when the generator is not in operation.

82. The process of claim 81 which further includes the steps of producing a change in state when the period of time is counted, and opening the first switch and the second switch responsive to the change in state.

83. The process of claim 82 which further includes the step of monitoring operation of the generator.

84. The process of claim 83 which further includes the step of producing an output signal when the generator produces a detected output signal.

85. The process of claim 84 wherein the generator produces a plurality of voltage spikes when the generator is in operation, and wherein the process further includes the steps of counting the voltage spikes, and producing the output signal for a count of the voltage spikes which exceeds a threshold count.

86. The process of claim 85 wherein the counting of the voltage spikes further includes the steps of periodically detecting the presence of a voltage spike during a defined period of time, incrementing a counter if the voltage spike is detected during the defined period of time and decrementing the counter if the voltage spike is not detected during the defined period of time.

87. The process of claim 86 which further includes the steps of producing a first output signal indicating that the generator is not running when the counter reaches zero, and producing a second output signal indicating that the generator is running when the counter reaches the threshold count.

88. The process of claim 85 which further includes the step of producing the output signal when the battery produces a voltage which exceeds a threshold voltage.

89. The process of claim 88 which further includes the step of closing the first switch and the second switch responsive to the output signal.

90. The process of claim 66 which further includes the step of activating an override switch to alter operations of the process.

91. The process of claim 90 which further includes the step of closing the first switch and the second switch responsive to the activating of the override switch.

92. A process for supplying uninterrupted power to equipment which is to be operated by a first battery, and a generator for charging the first battery when the generator is in operation, wherein the equipment includes first equipment having operative components which can be electrically disconnected without a loss of function and second equipment having operative components which can exhibit a loss of function when electrically disconnected, and wherein the process comprises the steps of:

electrically coupling the second equipment with a second battery which is separate from the first battery, providing direct current for operating the second equipment if the second equipment becomes disconnected from the first battery;

detecting when the generator is operating and the first battery is charging;

connecting the first battery to the first equipment and to the second equipment responsive to the detecting when the generator is operating and the first battery is charging;

detecting when the generator is not operating and the first battery is not charging, and starting a timer set to count a prescribed period of time responsive to the detecting when the generator is not operating and the first battery is not charging; and disconnecting the first equipment and the second equipment from the first battery after the prescribed period of time has been counted;

whereby the second equipment will remain connected to the second battery, maintaining a supply of power to the second equipment when disconnected from the first battery.

93. The process of claim 92 which further includes the step of charging the second battery when the first battery is connected to the second equipment.

94. The process of claim 92 which, following the detecting when the generator is not operating and the first battery is not charging, and the starting of the timer, further includes the steps of detecting when operation of the generator has resumed, discontinuing the count being performed by the timer, and reconnecting the first battery to the first equipment and to the second equipment.

95. The process of claim 94 wherein the detecting when operation of the generator has resumed further includes the steps of detecting a plurality of voltage spikes produced by the generator when the generator is in operation, and counting the voltage spikes.

96. The process of claim 95 wherein the counting of the voltage spikes further includes the steps of periodically detecting the presence of a voltage spike during a defined period of time, incrementing a counter if the voltage spike is detected during the defined period of time and decrementing the counter if the voltage spike is not detected during the defined period of time.

97. The process of claim 96 which further includes the steps of producing a first output signal indicating that the generator is not running when the counter reaches zero, and producing a second output signal indicating that the generator is running when the counter reaches a threshold count.

98. The process of claim 97 which further includes the step of detecting that the first battery produces a voltage which exceeds a threshold voltage.

99. The process of claim 92 which further includes the step of detecting when the first battery will not support continued operation of the second equipment.

100. The process of claim 99 which further includes the step of monitoring current passing between the first battery and the second equipment.

101. The process of claim 100 wherein the monitoring includes the steps of producing a first signal when the current is passing from the first battery to the second equipment, and producing a second signal when the current is not passing from the first battery to the second equipment.

102. The process of claim 101 wherein the monitoring includes the step of detecting when the voltage on the first battery drops below a voltage present on the second equipment.

103. The process of claim 101 which further includes the step of disconnecting the second equipment from the first battery responsive to the second signal.

104. The process of claim 99 which further includes the step of monitoring the voltage produced by the first battery.

105. The process of claim 104 which further includes the step of detecting when the voltage drops below a first threshold voltage.

106. The process of claim 105 which further includes the step of testing to determine when the voltage has dropped below the first threshold voltage for the prescribed period of time.

107. The process of claim 106 which further includes the step of producing an output signal when the voltage drops below the first threshold voltage for the prescribed period of time.

108. The process of claim 104 which further includes the step of detecting when the voltage exceeds a second threshold voltage.

109. The process of claim 104 which further includes the step of detecting when the voltage has a polarity which is opposite to a polarity necessary for operating the equipment which is to be operated by the first battery.

110. The process of claim 99 which further includes the step of disconnecting the second equipment from the first battery responsive to the detecting of the condition that the first battery will not support the continued operation of the second equipment.

111. The process of claim 110 which further includes the step of disconnecting the first equipment from the first battery responsive to the detecting of the condition that the first battery will not support the continued operation of the first equipment.

112. The process of claim 92 wherein the period of time is variably selectable.

113. The process of claim 92 which further includes the step of activating an override switch to alter operations of the process.

114. The process of claim 113 which further includes the step of connecting the first battery to the first equipment and to the second equipment responsive to the activating of the override switch.

* * * * *